US012785023B1

(12) United States Patent
Cipolla et al.

(10) Patent No.: US 12,785,023 B1
(45) Date of Patent: Nov. 3, 2026

(54) CAVITY MAGNETRON ASSEMBLY AND METHODS

(71) Applicant: Stellant Systems, Inc., Williamsport, PA (US)

(72) Inventors: John C. Cipolla, Montoursville, PA (US); Joseph C. Musheno, Williamsport, PA (US); Alan Palevsky, Wayland, MA (US); Michael S. Worthington, Unityville, PA (US)

(73) Assignee: Stellant Systems, Inc., Williamsport, PA (US)

( * ) Notice: Subject to any disclaimer, the term of this patent is extended or adjusted under 35 U.S.C. 154(b) by 0 days.

(21) Appl. No.: 19/215,845

(22) Filed: May 22, 2025

Related U.S. Application Data

(60) Provisional application No. 63/680,194, filed on Aug. 7, 2024, provisional application No. 63/650,562, filed on May 22, 2024.

(51) Int. Cl.
*H01J 25/54* (2006.01)

(52) U.S. Cl.
CPC .................................... *H01J 25/54* (2013.01)

(58) Field of Classification Search
CPC ............................................... H05B 2206/043
See application file for complete search history.

(56) References Cited

U.S. PATENT DOCUMENTS

2001/0004192 A1 * 6/2001 Miki ...................... H01J 23/10
315/39.51

* cited by examiner

*Primary Examiner* — Henry Luong
(74) *Attorney, Agent, or Firm* — Hooker & Habib, P.C.

(57) ABSTRACT

A magnetron assembly having an coolant assembly that allows for improved service of liquid cooling system components to evaluate and service blockages at reduced time, cost and effort without intensive de-construction and re-construction steps as well as an improved radiation transmission assembly for the in-phase transmission and tuning radiation energy from a magnetron anode to a magnetron antenna.

20 Claims, 10 Drawing Sheets

CAVITY MAGNETRON ASSEMBLY AND METHODS

RELATED APPLICATIONS

This application is a non-provisional of and claims priority to U.S. provisional patent Application No. 63/650,562 filed May 22, 2024 and U.S. provisional patent Application No. 63/680,194 filed Aug. 7, 2024, which priority applications are on the filing date of this patent application and are incorporated by reference as if fully set forth herein.

FIELD OF THE DISCLOSURE

The disclosure relates to cavity magnetrons having cooling system elements that allow for improved system service and maintenance thereof and having an output radiation transmission assembly that allows for the improved transmission of radiation energy from a magnetron anode to a magnetron antenna.

BACKGROUND OF THE DISCLOSURE

Cavity magnetrons generate output radiation for applications having a variety of frequency, power, and configuration requirements.

A magnetron's efficiency may be reduced by the poor mitigation of waste heat, especially in high output magnetron assemblies having high power requirements. In the operation of these systems, large amounts of waste heat can be generated. Without proper mitigation, waste heat can damage magnetron components.

Waste heat is conventionally mitigated in magnetron assemblies by the use of liquid cooling systems. These systems include a number of passages or channels configured as a cooling system circuit in proximity to magnetron elements that bear a heat load. Waste heat is transferred to a heat-bearing fluid and flowed away from the magnetron.

The cooling system circuit is contained with a plenum or manifold made of a metal material. The plenum is affixed to a magnetron by brazing or like essentially permanent means.

Coolant plenums are conventionally installed about the exterior of a magnetron's anode. Water is conventionally used as a heat-bearing fluid in these applications.

Problems arise over the operational life of these systems. As the system heats, metal ions from the plenum and other system components dissolve into the heated fluid medium. When the system eventually cools, these ions precipitate and form deposits within the cooling circuit.

These deposits form partial or complete blockages within the cooling circuit.

Blockages cannot be removed without time and labor intensive repair steps. Typical repair steps include the disassembly of the plenum from magnetron components to restore operational efficiency. This process can include the machining apart of assembly components, the re-assembly and re-calibration of assembly components as well as other costly and time intensive steps.

The cost and difficulty in properly completing these repair steps often leads users to replace a malfunctioning magnetron assembly in whole rather than undertaking a repair process.

As such blockages form long before the failure of other magnetron components, the inability to effectively maintain magnetron cooling systems negatively impacts the functional life span of high-output magnetrons.

A magnetron's efficiency may also be hindered by a poor "Quality-factor" or "Q-factor" toward the conversion of supplied energy to radiation output. Magnetrons having a lower $Q_e$-factor are capable of more efficiently generating output radiation, such as microwave signals, and operate at higher power levels with reduced energy waste through heat loss.

Cavity magnetrons conventionally include an electron-emitting cathode element within a generally hollow cylindrical anode element. The anode defines an interaction space surrounding the cathode and includes a number of interior resonant anode cavities each separated by radially located vanes.

Over magnetron operation, groups of electrons leave the cathode and enter the surrounding interaction space. Electrons rotate about cathode and travel toward the anode in circular paths under the effect of magnetic and electric fields applied to the interaction space.

As this cloud of electrons travels through this space and interacts with the resonant anode cavities, the electron's paths of motion are altered by interactions with the magnetic and electric fields therein. These interactions cause the electrons to transfer microwave radiation to the anode based upon cavity dimensions, the strength of an applied magnetic field and other factors.

A result of the electron cloud's rotating travel path is the non-uniform aggregation of electrons at the surface of the anode vanes. The electrons progressively travel to adjacent vanes within the anode, effectively generating oscillating positive and negative charges along adjacent vanes.

Alternating anode vanes will oscillate with positive and negative charges in-phase with one another over conventional operation of a magnetron.

Cavity magnetrons include feed elements joined to the anode body. These feed elements could include an output coupling or antenna to allow for the direction of microwave energy generated by the assembly. In applications, antennas may be housed within a waveguide element to specifically direct generated microwaves.

Known cavity magnetron feed elements are inefficient. They direct microwave energy unevenly from the anode body to an antenna do and not properly account for the in-phase transmission of microwave energy from the anode to an antenna, leading to reduced assembly efficiency.

Thus, there is a need for an improved cavity magnetron assembly to overcome these problems.

SUMMARY OF THE DISCLOSURE

Disclosed is a magnetron having an improved coolant assembly to allow for the simplified service of a magnetron cooling system and having an improved radiation transmission assembly to allow for the in-phase transmission of radiation energy from a magnetron anode to a magnetron antenna.

The coolant assembly may use elastic elements to secure a magnetron coolant plenum to the exterior of a magnetron anode. The elastic elements allow for the straightforward installation and removal of the plenum from the anode to service a cooling system circuit without labor-intensive disassembly steps such as the machining apart or de-brazing of metal components.

The improved radiation transmission assembly includes a series of energy transmission feed legs joined to alternating vanes located about the circumference of an anode. This provides for the feed legs to be joined to like-phased vanes during operation of the magnetron. This allows for improved energy transmission from the anode body to a radiation output antenna joined to the feed legs as well as providing for an efficient transmission path from each vane to the radiation output antenna for improved performance.

Other objects and features of the disclosure will become apparent as the description proceeds, especially when taken in conjunction with the accompanying drawing sheets illustrating one or more illustrative embodiments.

DISCLOSURE

Magnetron assembly 10 includes an anode assembly 12 and a plenum assembly 14.

Figure 1:
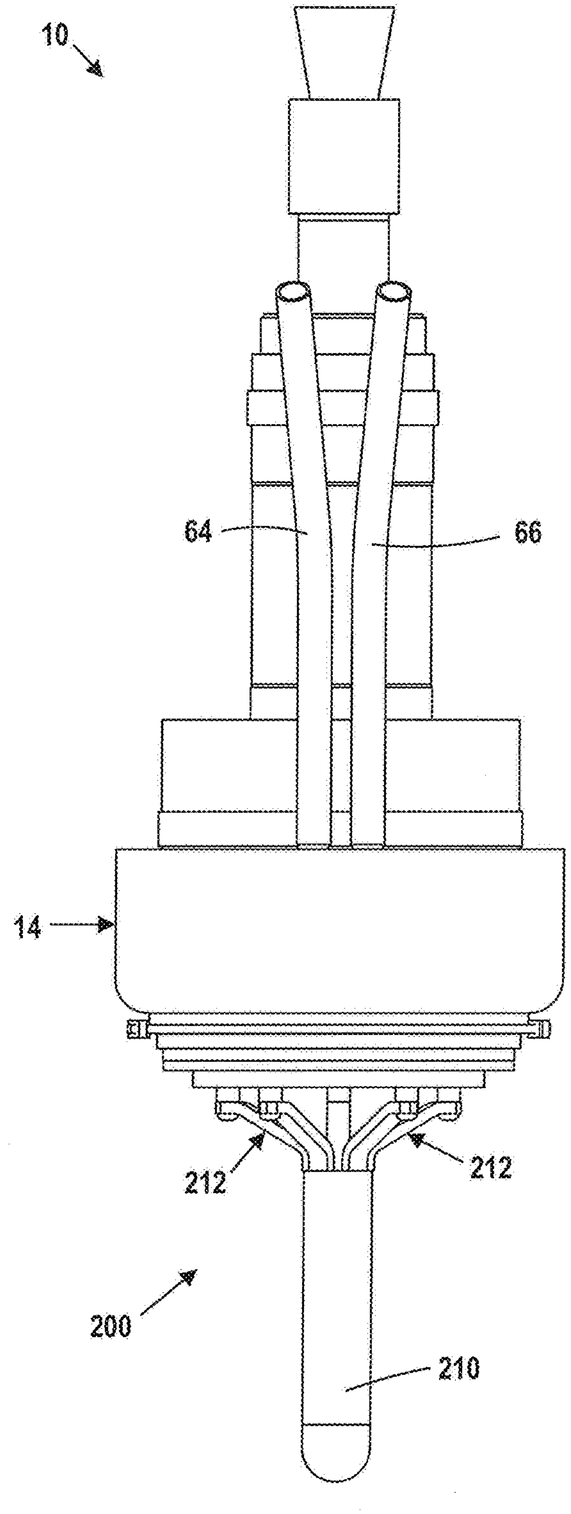
FIG. 1 is a side view of the disclosed assembly.

FIG. 1 provides a side view of disclosed assembly 10. A conventional assembly may include a ceramic dome to maintain a vacuum envelope over internal assembly elements as is known in the art. In order to clearly illustrate assembly elements related to the output antenna, the dome is not illustrated in the present figures.

Anode assembly 12 includes an anode body 16 having the general form of a hollow cylinder extending between opposed open ends 16' and 16". Anode body 16 includes an interior anode body surface 18 having a number of radially-extending vanes 20 and an exterior anode body surface 22.

Each vane 20 may have a generally uniform rectangular shape extending between body ends 16' and 16", and including opposed vane side wall surfaces 20' and centrally-facing vane tip or nose surface 20". See FIG. 6.

Interior anode body surface 18 defines a central, generally cylindrical interaction space 24 within anode assembly 12 in which a central cathode element 26 is located. Cathode element 26 generates radiation that is transmitted to an output antenna as explained in greater detail below.

Vanes 20 are spaced evenly about the circumference of anode 12. An adjacent pair of vanes 20 defines a resonant anode cavity 28 there between.

Anode body 16 includes a number of anode coolant passages 30 located within vane 20.

Each anode coolant passage 30 extends from a first, lower aperture 32 at exterior anode body surface 22 along first sub-passage 34 to a passage interior junction 36 located proximate interior anode body surface 18 within an anode vane 20. The anode coolant passage 30 extends further outwardly away from junction 34 along second sub-passage 38 to a second, upper aperture 40 located at exterior anode body surface 22.

Anode coolant passage 30 may have a V-shape with sub-passages 34, 38 being generally linear in form. See FIG. 10.

Figure 10:
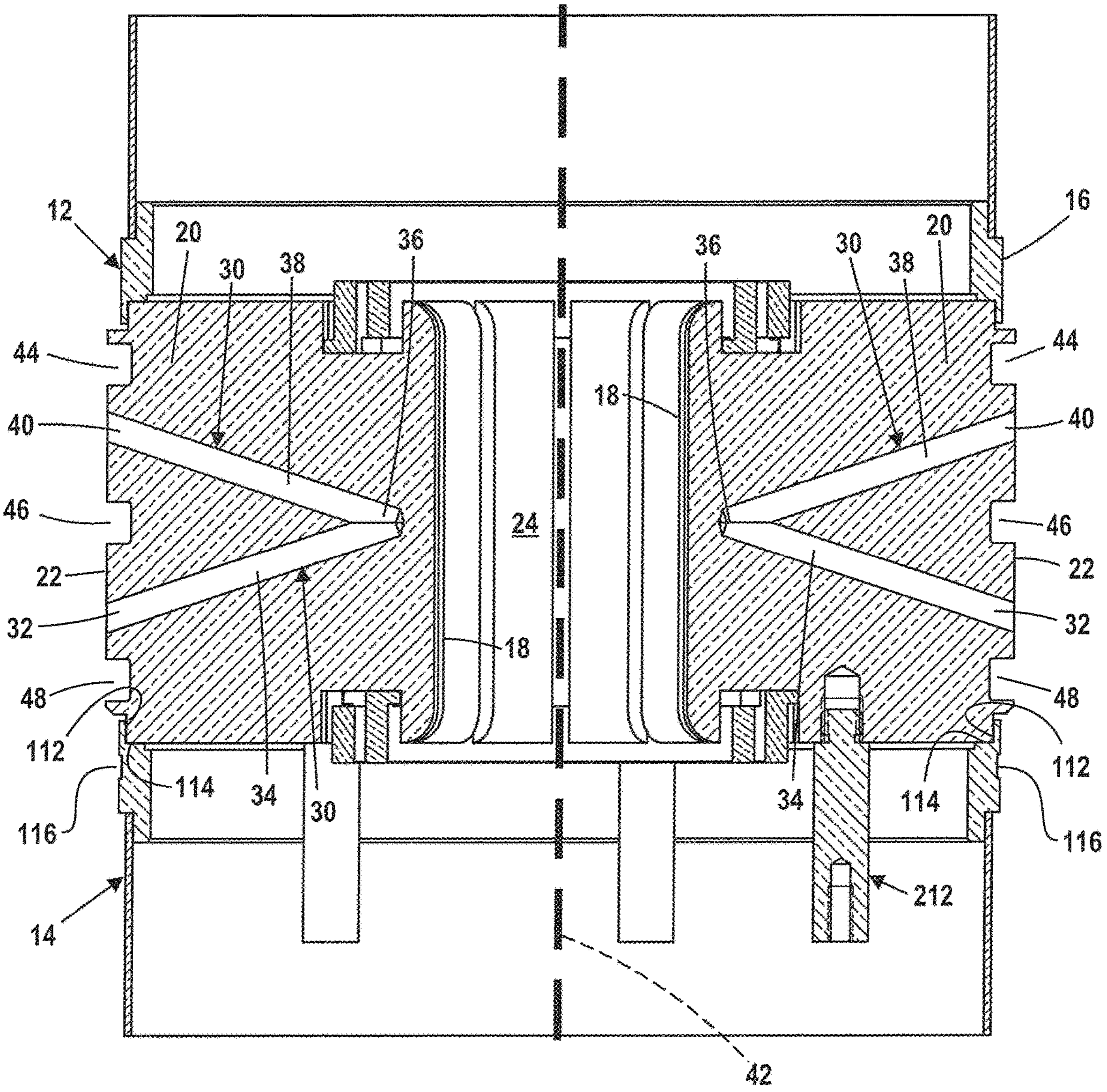
FIG. 10 is a sectional view taken along line 10-10 of FIG. 6.
Figure 11:
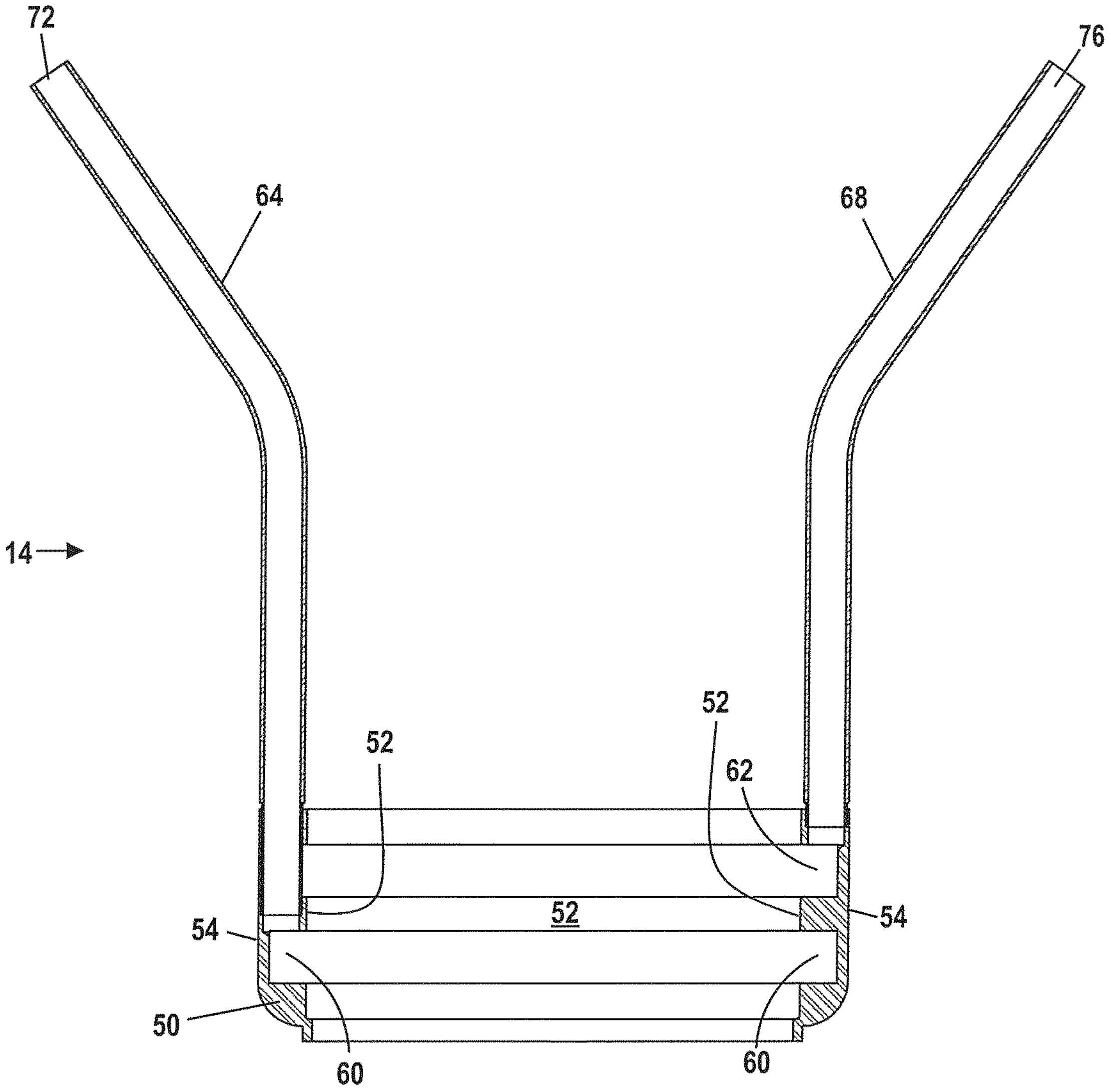
FIG. 11 is a sectional view of an assembly plenum taken along line 11-11 of FIG. 9.

As shown in FIG. 10, first, lower aperture 32 and second, upper aperture 40 may be located in alignment with one another and be generally parallel to a major anode axis 42 extending along the anode interaction space 24 so that anode coolant passage 30 is located substantially centrally within a given vane 20.

As shown in the Figures, anode 12 may include a number of anode coolant passages 30. In embodiments, coolant passages 30 may be located circumferentially evenly spaced about anode body 16 with each passage 30 located in each anode vane 20.

Exterior anode body surface 22 also includes a set of annular grooves 44, 46 and 48 extending about the perimeter of surface 22. Annular grooves 44, 46 and 48 are similar to each other, having a generally rectangular cross-section, with upper groove 44 located adjacent an aperture 40 of coolant passage 30, central groove 46 located between apertures 40 and 32 of a coolant passage 30, and lower groove 48 located adjacent an aperture 32 coolant passage 30.

Each annular groove 44, 46, 48 is adapted to receive an assembly sealing element as explained below.

Plenum assembly 14 includes a plenum body 50 having the general form of a hollow cylinder, extending from an interior plenum body surface 52 to an exterior plenum body surface 54. A central, generally cylindrical anode receiving space 56 is located within plenum body 50. See FIGS. 4, 7-9 and 11.

Interior plenum body surface 52 includes first, lower annular plenum coolant passage 60 and second, upper annular plenum coolant passage 62. Passages 60, 62 extend about the perimeter of surface 52 and have generally rectangular cross-sections. See FIGS. 4 and 11

Plenum assembly 14 also includes input line passages 64, 66 and output line passages 68, 70. See FIGS. 4 and 11.

Input line passages 64, 66 are in fluid communication with first, lower annular plenum coolant passage 60.

Output line passages 68, 70 are in fluid communication with second, upper annular plenum coolant passage 62.

The free ends 72, 74 of passages 64, 66 are adapted to be connected to coolant input lines (not illustrated) as described below. Likewise, the free ends 76, 78 of passages 68, 70 are adapted to connected to coolant be output lines (not illustrated) as described below.

Figure 12:
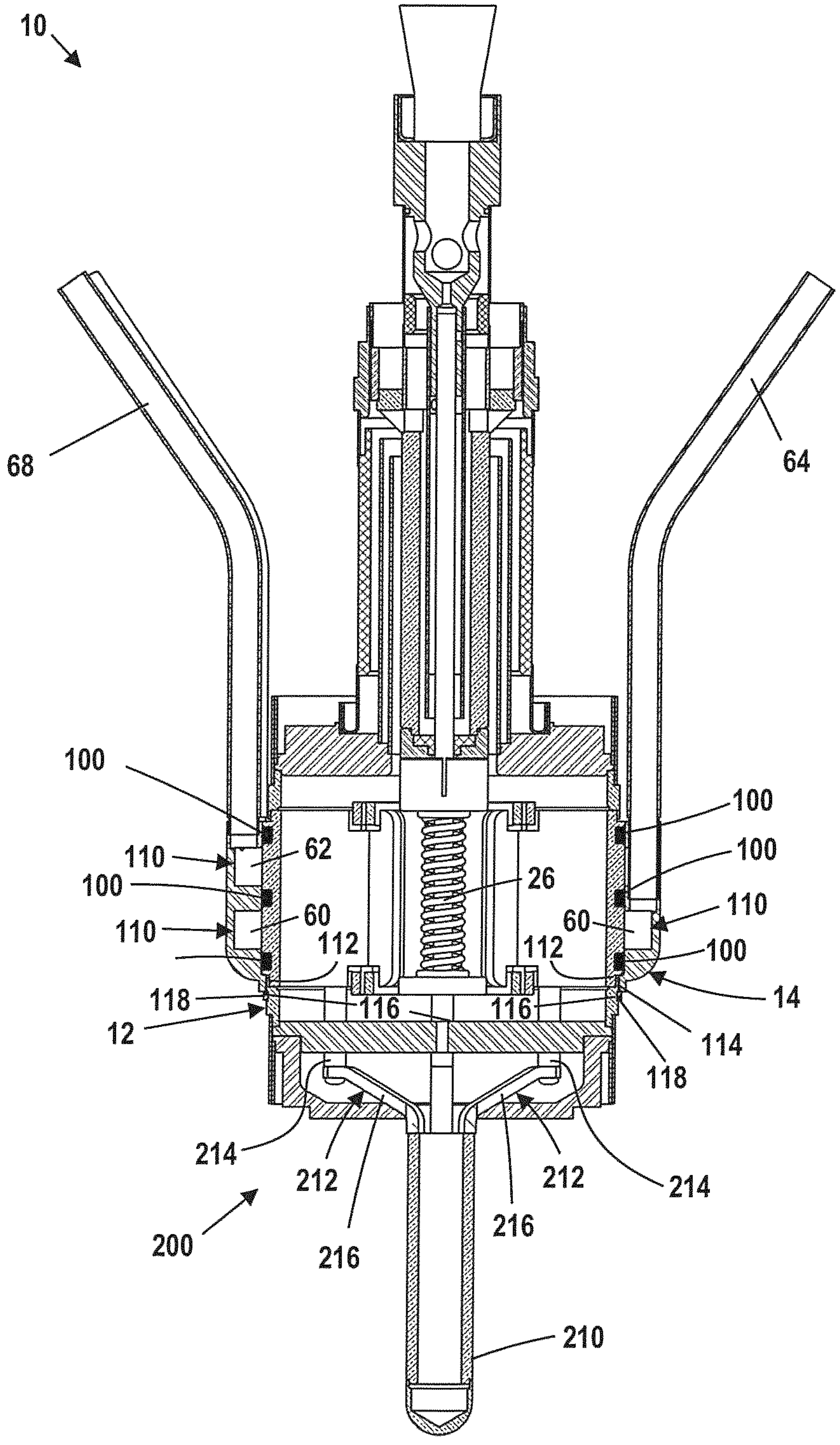
FIG. 12 is a sectional view of the assembly taken along line 12-12 of FIG. 3.

An assembly sealing element 100 is located in each annular groove 44, 46, 48 in anode body 16 exterior anode body surface 22. See FIG. 12.

Assembly sealing element 100 may be an elastic element seated within an annular groove 44, 46, 48. In embodiments, sealing element 100 may be an O-Ring, Quad-Ring or similar elastomeric ring. In embodiments, sealing element 100 may be made of polymer or an elastomeric compound such as natural or synthetic rubber.

Assembly sealing element 100 is capable of forming a fluid-tight seal between anode assembly 12 and a plenum assembly 14 within magnetron assembly 10. At the installation of plenum assembly 14 onto and around anode assembly 12, sealing element 100 is further capable of securing plenum assembly 14 in position relative to anode assembly 12.

Assembly sealing elements 100 are also capable of forming fluid-tight seals between elements of an assembly cooling system circuit formed at the insertion of plenum assembly 14 into anode assembly 12 as explained below.

Figure 4:
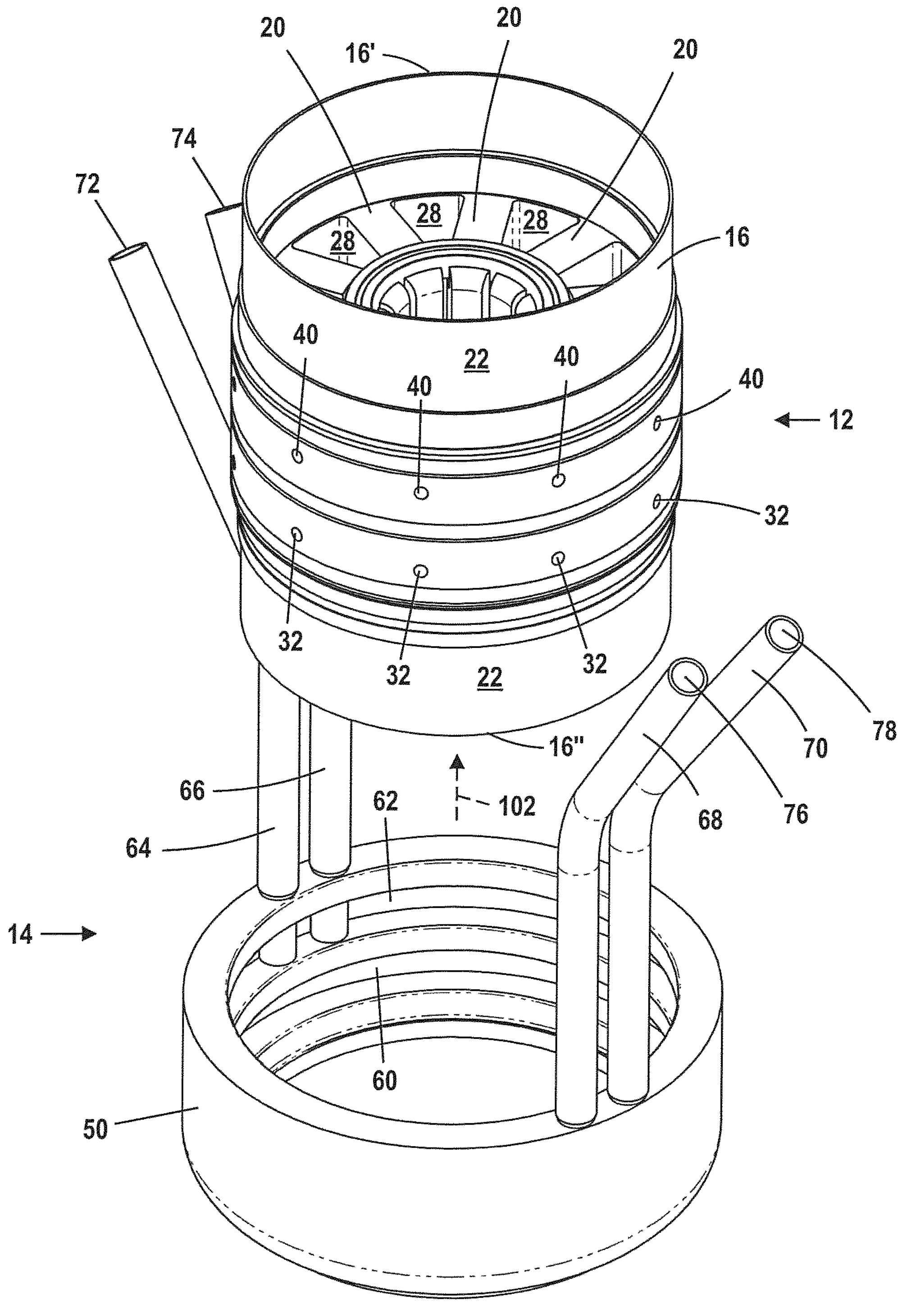
FIG. 4 is an exploded view of the assembly anode and an assembly plenum.

In use of magnetron assembly 10, plenum assembly 14 is inserted onto and around anode assembly 12 in the direction of arrow 102 as illustrated in FIG. 4.

In assembly 10, generally cylindrical anode body 16 is sized to fit within generally cylindrical anode receiving space 56. Anode body 16 is secured within anode receiving space 56 by assembly sealing elements 100 located within annular grooves 44, 46, 48.

At insertion of plenum assembly 14 onto and around anode assembly 12, assembly sealing elements 100 are compressed by interior plenum body surface 52 to form compression fit between elements 100 and plenum assembly 14.

The compression fit is sufficient to secure plenum assembly 14 to anode assembly 12 during operation of magnetron 10.

In embodiments, the magnetron assembly 10 may have additionally means to secure plenum assembly 14 about anode assembly 12, as described below.

At insertion of plenum assembly 14 onto and around anode assembly 12, anode coolant passages 30, first, lower annular plenum coolant passage 60 and second, upper annular plenum coolant passage 62 are located in fluid communication with one another to partially form assembly cooling system circuit 110.

Assembly cooling system circuit 110 extends from the free ends 72, 74 of input line passage 64, 66 to a coolant passage formed by first, lower annular plenum coolant passage 60 and exterior anode body surface 22. Circuit 110 continues along one or more anode coolant passages 30 extending from a first, lower passage aperture 32 first sub-passage 34 upwardly to second sub-passage 38 an to upper passage aperture 40.

Circuit 110 further extends from passage aperture 40 to the passage formed by second annular plenum coolant passage 62 and further to output line passages 68, 70 and free ends 76, 78 thereof.

The compression fit provided by sealing elements 100 is sufficient to form fluid-tight seals between adjacent portions of circuit 110, including adjacent portions of first, lower annular plenum coolant passage 60 and second, upper annular plenum coolant passage 62.

Over operation of magnetron assembly 10, as heat is generated at various elements of the assembly, a heat-bearing medium fluid is flowed into cooling system circuit 110 through coolant input line passage 64, 66. The heat-bearing medium fluid then flows through lower annular plenum coolant passage 60, to the anode coolant passages 30 and to upper second annular plenum coolant passage 62 and out of the assembly through coolant output line passages 68, 70. Over this process, the heat-bearing medium fluid gains heat from components of the magnetron to transfer such heat away from the assembly.

In the case of using certain heat-bearing medium fluids, including water, in assembly 10, mineral deposits may form within circuit 110 that block the flow of a fluid therethrough.

In the case of deposits forming within circuit 110, the disclosed assembly allows for a simplified remediation method by removing plenum assembly 14 from anode assembly 12 so that circuit 110 can be evaluated and cleaned without complicated disassembly steps.

In particular, the generally linear sub-passages 34, 38 of anode coolant passage 30 allow for the removal of deposits with elongate tools and/or drills.

In assembly embodiments, anode assembly 12 may include an anode retention ledge 112 that extends circumferentially about the lower end of exterior anode body surface 20. Retention ledge 112 is adapted to engage retention stop surface 114 that extends circumferentially about the lower end of plenum assembly 14 and proximate to interior plenum body surface 52. See FIGS. 10 and 12.

At the insertion of plenum assembly 14 onto and round anode assembly 12, the engagement of retention stop surface 114 against anode retention ledge 112 helps assure the proper location of plenum assembly 14 relative to anode assembly 12 and proper formation of assembly cooling system circuit 110.

In further assembly embodiments, exterior anode body surface 22 may include an annular retention groove 116 located proximate anode retention ledge 112.

Annular retention groove 116 is adapted to receive an assembly retention element 118.

After plenum assembly 14 is inserted onto anode assembly 12 in magnetron assembly 10, an assembly retention element 118 may be located in retention groove 116.

Assembly retention element 118 may be a loop element such as a plastic zip-tie, elastic band of the like, located within groove 116 and having a sufficient thickness to prevent the unintended removal of plenum assembly 14 from anode assembly 12.

Additional means to additionally secure plenum assembly 14 about anode assembly 12 are contemplated, including the use of a latching or locking mechanism and/or removable fasteners extended through aligned security apertures within assembly 10 and/or anode assembly 12 and plenum assembly 14. Such removable fasteners might include zip-ties, a C-clip, bolt elements of the like.

In embodiments, magnetron assembly 10 includes a radiation transmission assembly 200 for the improved transmission of output radiation from anode assembly 12 to an output antenna 210.

Figure 6:
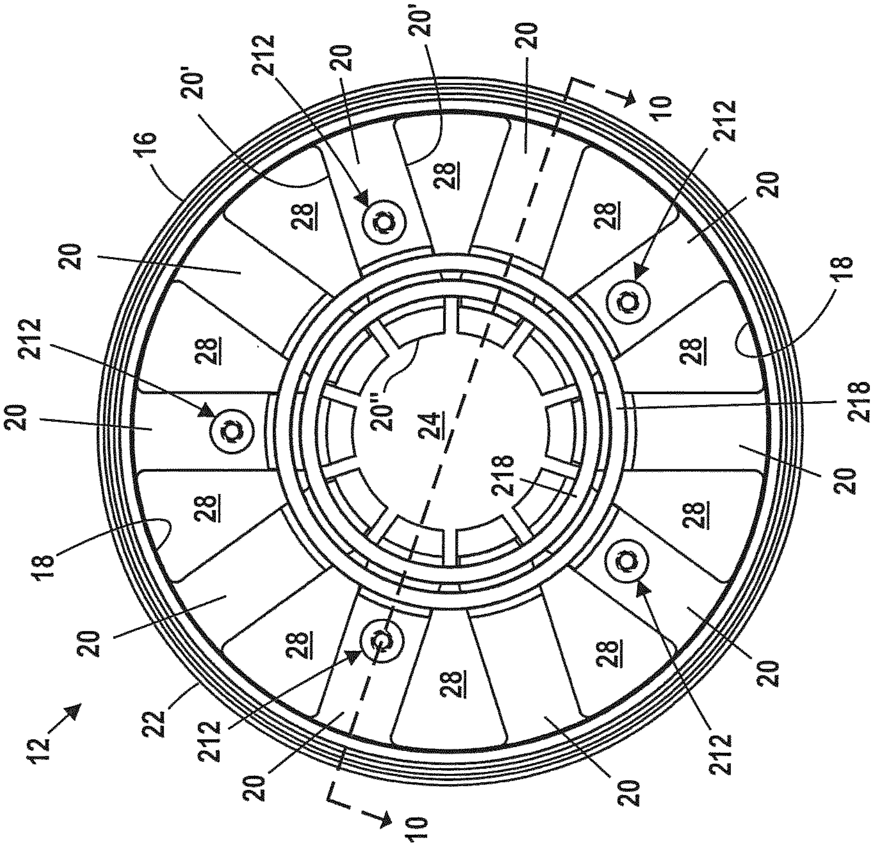
FIG. 6 is a bottom view of an assembly anode.
Figure 5:
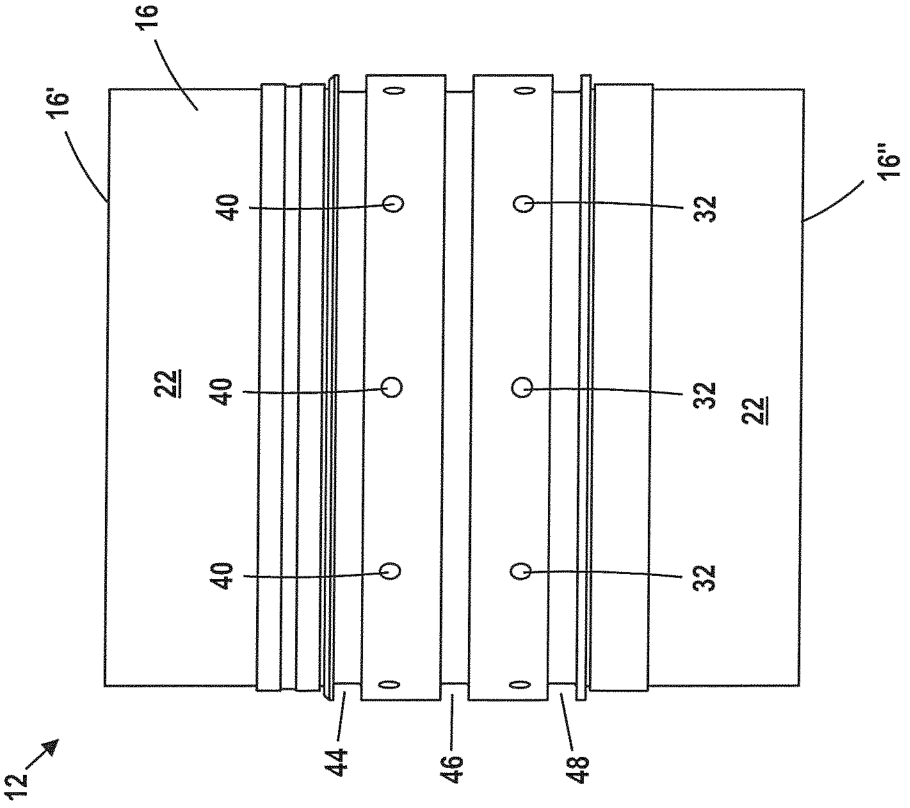
FIG. 5 is a side view of an assembly anode.
Figure 7:
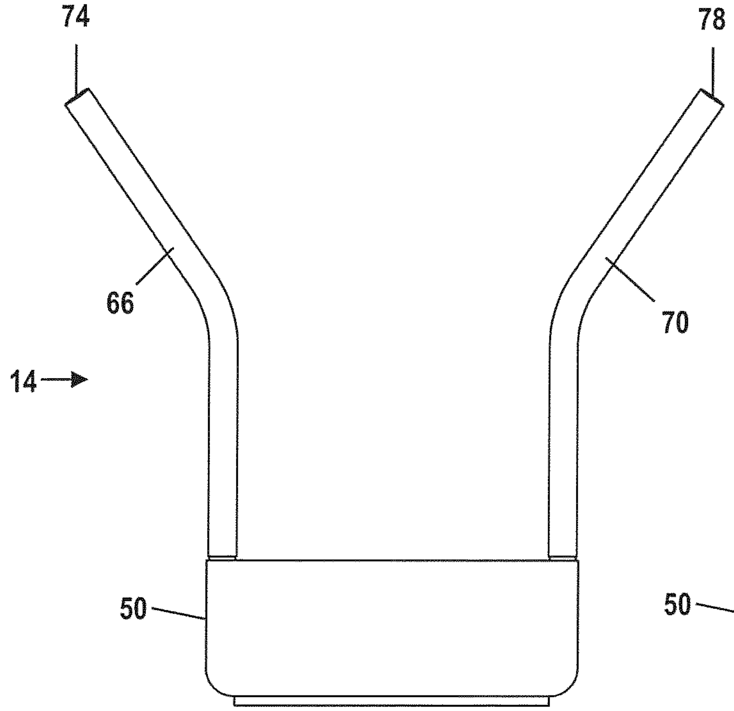
FIGS. 7 and 8 are side views of an assembly plenum.
Figure 8:
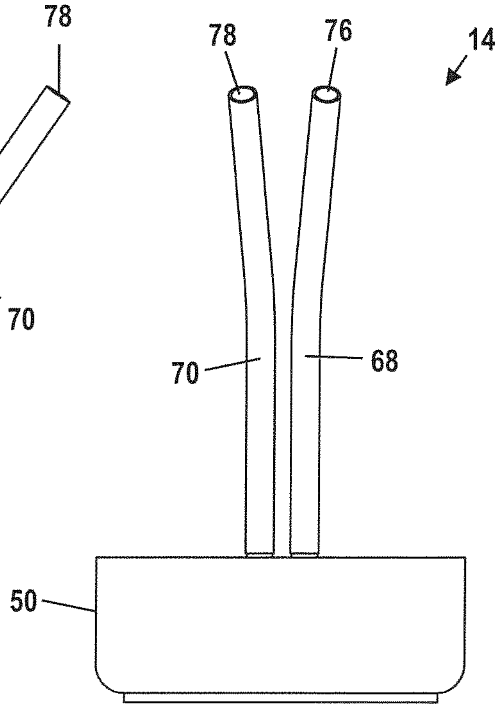
Figure 9:
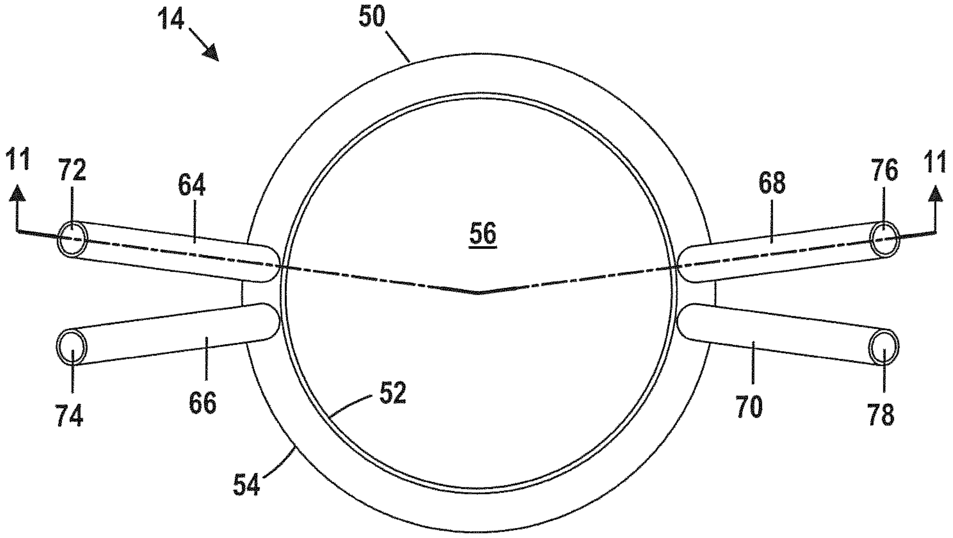
FIG. 9 is a top view of an assembly plenum.

As shown in FIG. 6, in embodiments of magnetron assembly 10, anode assembly 12 includes ten (10) vanes 20 which define ten (10) corresponding anode cavities 28.

In given embodiments, magnetron assembly 10 may include a top anode cover plate (not illustrated) as is known in the art.

An radio frequency output antenna 210 is joined to anode assembly 12 by a number of signal transmission feed legs 212.

In embodiments, each signal transmission feed leg 212 is joined to an alternating vane 20 about the circumference of anode assembly 12 as shown in the figures so that feed legs 212 are evenly spaced about the circumference of anode assembly 12. See FIG. 6.

Each transmission feed leg 212 may include a post element 214 joined to a vane 20 and a rail element 216 joining post element 214 to output antenna 210.

Figure 2:
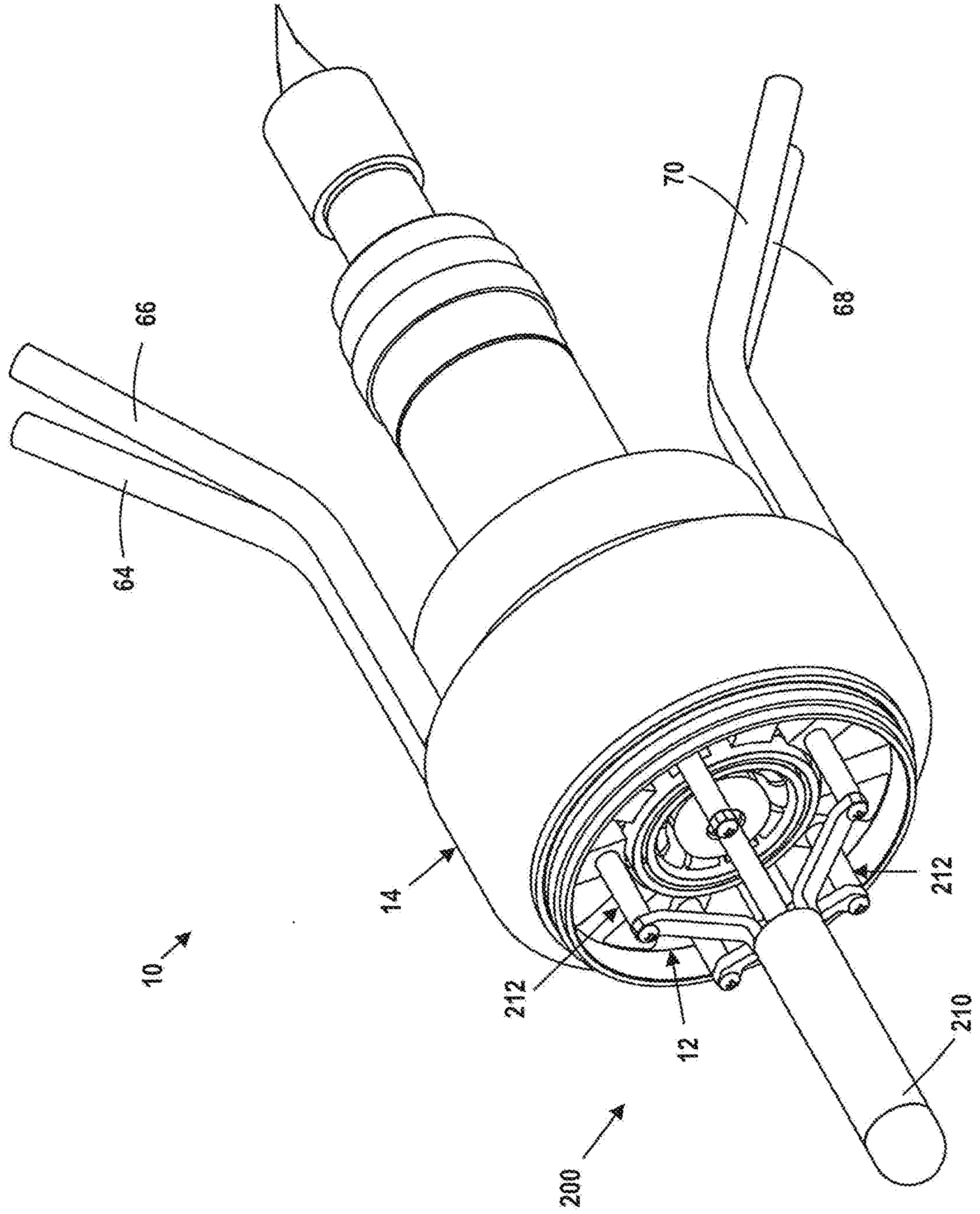
FIG. 2 is a perspective side view of the assembly.
Figure 3:
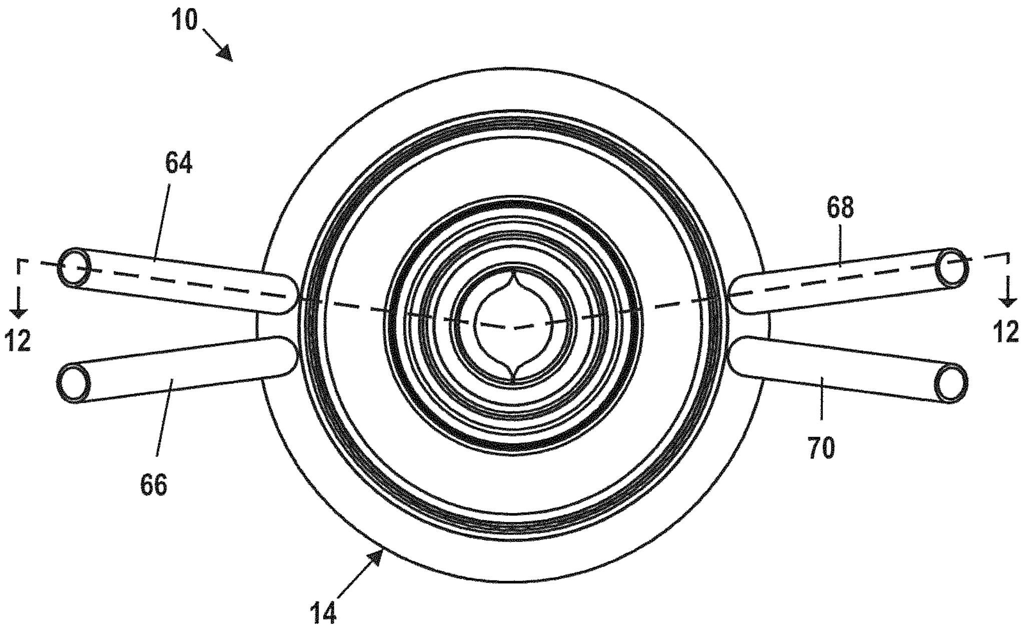
FIG. 3 is a top view of the assembly.

As shown in FIGS. 2 and 6, radiation transmission assembly 200 may have five (5) signal transmission feed legs 212.

In embodiments, magnetron assembly 10 may be a vane and strap type magnetron including one or more straps 218 joined to anode assembly 12, each strap 218 having the form of a circular ring joined to alternating vanes 20 at an open end 16' and/or 16" of anode body 16.

Straps 218 may be used to manage operating resonance frequency and assure that magnetron assembly 10 operates in a desired primary mode of oscillation, or n-mode, as is known in the art.

In applications in which magnetron 10 is a vane and strap type magnetron, a preferred number straps 218 is selected based upon the specific radiation output requirements while maintaining primary mode oscillation and avoiding possibilities of oscillation in undesired degenerate modes.

During use of magnetron assembly 10, every other vane 20 is in a similar or identical phase, caring a like oscillating positive or negative charge as described above. The placement of a signal transmission feed leg 212 corresponding to like-phased vane 20 provides for improved signal transmission from anode assembly 12 to output antenna 210.

Radiation transmission assembly 200 also allows for a direct, short transmission path from each vane 20 to output antenna 210 as well as reliable, uniform in-phase signal transmission to output antenna 210. This provides for an improved overall efficiency toward the conversion of DC expenditure to RF output for magnetron assembly 10. This likewise provides for a higher efficiency transport of generated microwave signals to a load object receiving the microwave energy. This allows the assembly to operate at higher power, as less energy is wasted through heat loss.

Figure 13:
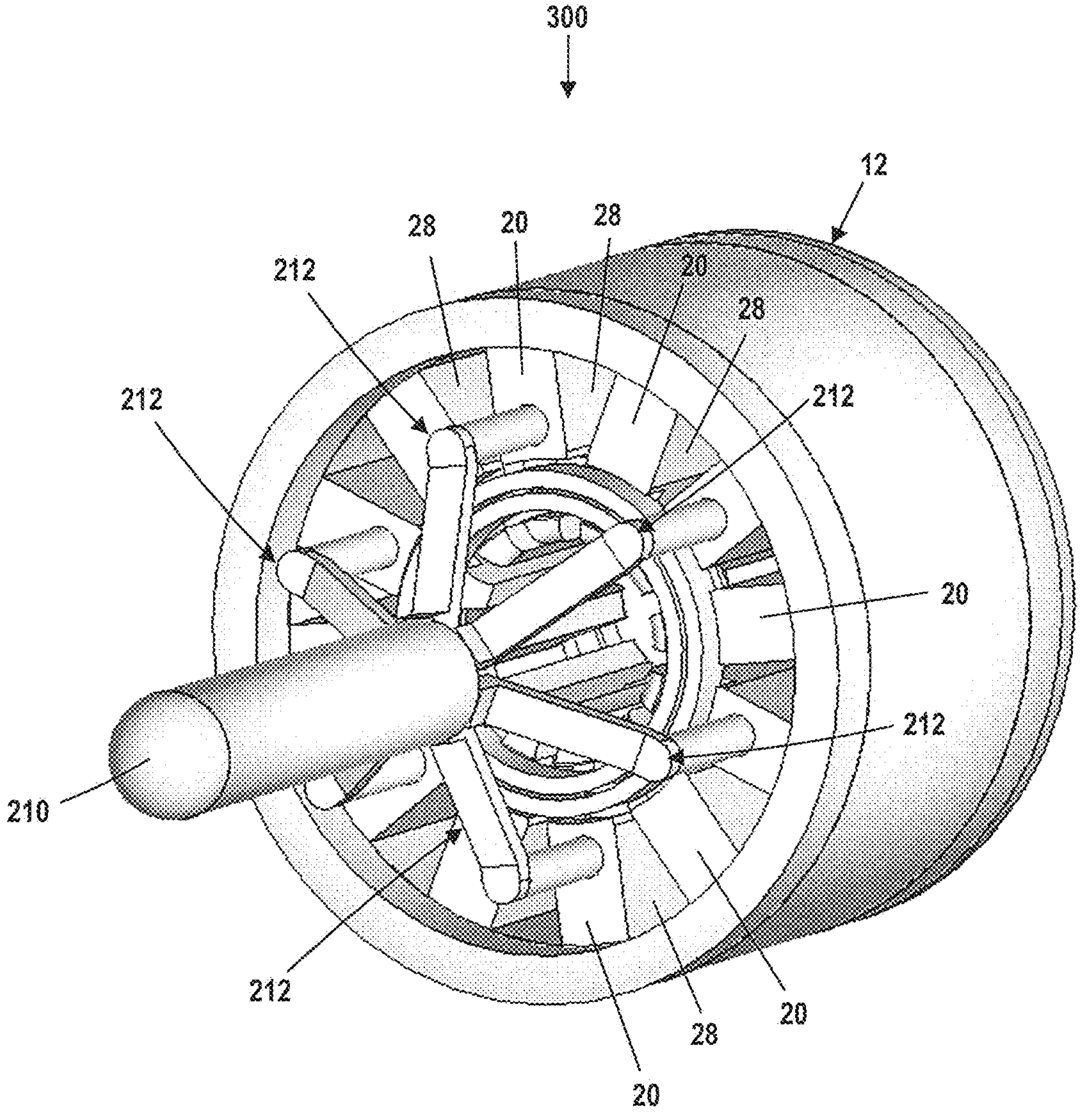
FIG. 13 is a perspective view of an alternate embodiment assembly anode.

FIG. 13 illustrates an alternate embodiment magnetron assembly 300 having a cylindrical anode assembly 12 including twelve vanes 20 and twelve anode cavities 28.

Assembly 300 employs six signal transmission feed legs 212 joined to alternating vanes 20. Transmission feed legs 212 are joined to output antenna 210.

Assembly efficiency may be improved by the magnetron having an anode assembly containing an even number of vanes (N), the vanes defining an even number of anode cavities (N), with a number of feed legs (N/2), wherein the feed legs are joined to alternating vanes extending about the anode assembly.

While the figures of the present disclosure illustrate embodiments of a magnetron assembly 10 including an anode assembly 12 having ten vanes 20 or twelve vanes 20 to accommodate different application requirements, other assembly embodiments are contemplated wherein anode assembly 12 has different even number of vanes (N).

In particular embodiments wherein magnetron assembly 10 is a vane and strap type magnetron having one or more straps 218 joined to anode assembly 12, anode assembly 12 may have a number of vanes N of six (6) and a corresponding number of feed legs N/2 of three (3); or a number of vanes N of eight (8) and a corresponding number of feed legs N/2 of four (4); or a number of vanes N of ten (10) and a corresponding number of feed legs N/2 of five (5); or a number of vanes N of twelve (12) and a corresponding number of feed legs N/2 of six (6); or a number of vanes N of fourteen (14) and a corresponding number of feed legs N/2 of seven (7).

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art including (but not limited to) changes in material selection, environment of use, size, operating ranges, and the like, as well as such changes and alterations that fall within the purview of the following claims.

What is claimed is:

1. A magnetron assembly comprising:

an anode assembly having a cylindrical anode body and a plenum assembly, said anode assembly extending along a major anode axis between opposed anode open ends and comprising an interior anode body surface and an exterior anode body surface, said interior anode body surface comprising a plurality of vanes extending from said interior anode body surface toward said major anode axis, said interior anode body surface substantially surrounding an interaction space extending along said major anode axis, said exterior anode body surface comprising one or more anode annular grooves extending about said anode body, said plenum assembly comprising a plenum body having a cylindrical interior plenum body surface and an exterior plenum body surface, said interior an anode receiving space and plenum body surface defining comprising one or more plenum coolant passages, each plenum coolant passage extending about plenum body, an assembly sealing element located in at least one of said anode annular grooves and extending about said cylindrical anode body, said anode body located within said anode receiving space and said exterior anode body surface proximate with said interior plenum body surface, said assembly sealing element engaging said interior plenum body surface and said exterior anode body surface.

2. The magnetron assembly of claim 1 wherein said exterior anode body surface comprises an annular retention groove extending about said anode body, said annular retention groove having an assembly retention element.

3. The magnetron assembly of claim 2 wherein at least one of said vanes comprises an anode coolant passage, in fluid communication with at least one of said plenum coolant passages, said anode coolant passage extending from a first, lower anode coolant passage aperture to a second upper anode coolant passage aperture.

4. The magnetron assembly of claim 3 wherein said anode coolant passage is V-shaped and comprises first and second linear sub-passages.

5. A magnetron assembly of claim 4 wherein said exterior anode body surface comprises three said annular grooves wherein first annular groove is located between said anode open end and said first, lower anode coolant passage aperture, a second annular groove is located between said first, lower anode coolant passage aperture and said second, upper anode coolant passage aperture and said third annular groove is located between said upper anode coolant passage aperture and said opposed anode open end.

6. The magnetron assembly of claim 5 comprising an assembly sealing element in each said annular groove, each said assembly sealing element comprised of an elastomeric material.

7. The magnetron assembly of claim 6 wherein each said assembly sealing element comprises an O-Ring.

8. The magnetron assembly of claim 7 wherein said assembly retention element comprises a plastic zip-tie.

9. The magnetron assembly of claim 8 comprising a feed leg joined to a vane, said feed leg extending from said vane to an output antenna, said anode assembly further comprising one or more straps, each said strap joined to two or more of said plurality of vanes.

10. A magnetron assembly comprising:

an anode having a cylindrical anode body extending along a major anode axis between a first anode open end and a second anode open end, said anode body comprising an interior anode body surface and an exterior anode body surface, said interior anode body surface comprising a plurality of vanes extending from said interior anode body surface toward said major anode axis and an interaction space extending along said major anode axis, said exterior anode body surface comprising one or more anode annular grooves extending about said anode body, an assembly sealing element located in at least one of said anode annular grooves and extending about said cylindrical anode body;

a plenum assembly comprising a plenum body having a cylindrical interior plenum body surface and an exterior plenum body surface, said interior plenum body surface defining an anode receiving space and comprising one or more plenum coolant passages, each plenum coolant passage extending about plenum body, said anode body located within said anode receiving space and said exterior anode body surface proximate with said interior plenum body surface, said assembly sealing element engaging said interior plenum body surface and said exterior anode body surface wherein said plenum assembly is secured in position relative to said anode by said assembly sealing element.

11. The magnetron assembly of claim 10 wherein said exterior anode body surface comprises an annular retention groove extending about said anode body, said annular retention groove having an assembly retention element.

12. The magnetron assembly of claim 11 wherein at least one of said vanes comprises an anode coolant passage, in fluid communication with at least one of said plenum coolant passages, said anode coolant passage extending from a first, lower anode coolant passage aperture to a second upper anode coolant passage aperture.

13. A magnetron assembly of claim 12 wherein said exterior anode body surface comprises three said annular grooves wherein a first annular groove is located between said anode open end and said first, lower anode coolant passage aperture, a second annular groove is located between said first, lower anode coolant passage aperture and said second, upper anode coolant passage aperture said third annular groove is located between said upper anode coolant passage aperture and said opposed anode open end wherein said assembly sealing elements in said annular grooves provide a fluid-tight seal between said anode and said plenum assembly.

14. The magnetron assembly of claim 13 wherein said assembly sealing elements comprise elastomeric O-Rings.

15. The magnetron assembly of claim 14 wherein said plenum assembly further comprises one or more input line passages and one or more output line passages in fluid communication with said one or more plenum coolant passages, said one or more input line passages, said one or more output line passages, said one or more plenum coolant passages and said anode coolant passage comprising an assembly cooling system circuit.

16. The magnetron assembly of claim 15 wherein said assembly cooling system circuit comprises a heat-bearing fluid.

17. A magnetron assembly comprising an anode having a anode body extending along a major anode axis between a first anode open end and a second anode open end, said anode body comprising a cylindrical exterior anode body surface comprising one or more anode annular grooves extending about said anode body and an assembly sealing element located in at least one of said anode annular grooves and extending about said cylindrical anode body surface and a plenum assembly comprising a plenum body having an interior cylindrical plenum body surface defining an anode receiving space and comprising one or more plenum coolant passages extending about plenum body said anode body located within said anode receiving space and said exterior anode body surface proximate with said interior plenum body surface, said assembly sealing element engaging said interior plenum body surface and said exterior anode body surface wherein said plenum assembly is secured in position relative to said anode by said assembly sealing element.

18. The magnetron assembly of claim 17 wherein said anode comprises an anode retention ledge extending circumferentially about an anode open end and said plenum assembly comprises a retention stop surface that extends circumferentially about said plenum assembly body surface wherein anode retention ledge engages said retention stop surface.

19. The magnetron assembly of claim 18 wherein said exterior anode body surface comprises an annular retention groove extending about said anode body, said annular retention groove having an assembly retention element.

20. The magnetron assembly of claim 19 wherein said assembly sealing element comprises an elastomeric O-Ring and said assembly retention element comprises a plastic zip-tie.

* * * * *